United States Patent [19]
Tabone

[11] 3,724,128
[45] Apr. 3, 1973

[54] PLANTER

[76] Inventor: Michael T. Tabone, 248881 Ward, Taylor, Mich. 48180

[22] Filed: Jan. 15, 1971

[21] Appl. No.: 106,833

[52] U.S. Cl. ....................................................47/33
[51] Int. Cl. ..............................................A01g 1/08
[58] Field of Search ....................47/32.3, 23.5; 94/31

[56] References Cited

UNITED STATES PATENTS

| | | | |
|---|---|---|---|
| 1,986,046 | 1/1935 | Cross | 47/33 |
| 3,373,668 | 3/1968 | Moore et al. | 47/33 X |
| 3,520,082 | 7/1970 | Smith | 47/33 |
| 1,916,494 | 7/1933 | Schrickel | 47/33 |
| 3,545,127 | 12/1970 | Jensen | 47/33 |
| 2,909,328 | 10/1959 | Babyak | 47/33 |
| 2,978,837 | 4/1961 | Daniels | 47/33 |

FOREIGN PATENTS OR APPLICATIONS

| | | | |
|---|---|---|---|
| 1,048 | 1894 | Great Britain | 47/33 |

Primary Examiner—Robert E. Bagwill
Attorney—David A. Maxon

[57] ABSTRACT

This invention relates to a planter. It comprises plastic toroidal members having corresponding interlocking male and female portions. These members have an inner upward vertical portion; an intermediate horizontal portion; and an outer downward vertical portion. The inner upward vertical portion is raised above the ground and surrounds the soil which is immediately adjacent the plant. The intermediate horizontal portion is substantially level with the ground level outward from but adjacent the planter. The outward downward vertical portion depends from the intermediate horizontal portion and extends vertically downward therefrom segregating the soil portion, outward from but adjacent the planter, from the plant.

13 Claims, 6 Drawing Figures

PATENTED APR 3 1973 3,724,128
FIG. 1
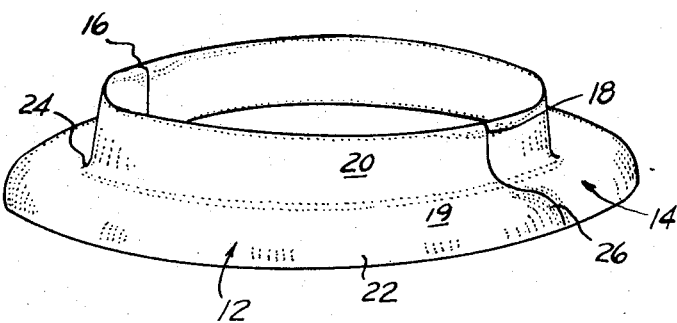
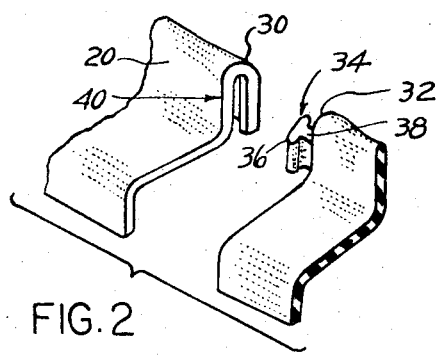
FIG. 2
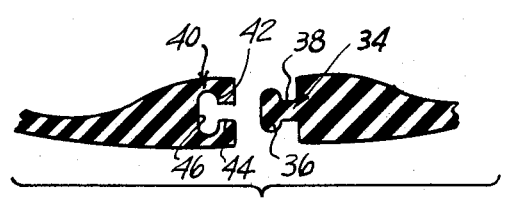
FIG. 5

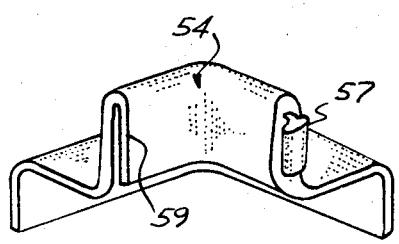
FIG. 4
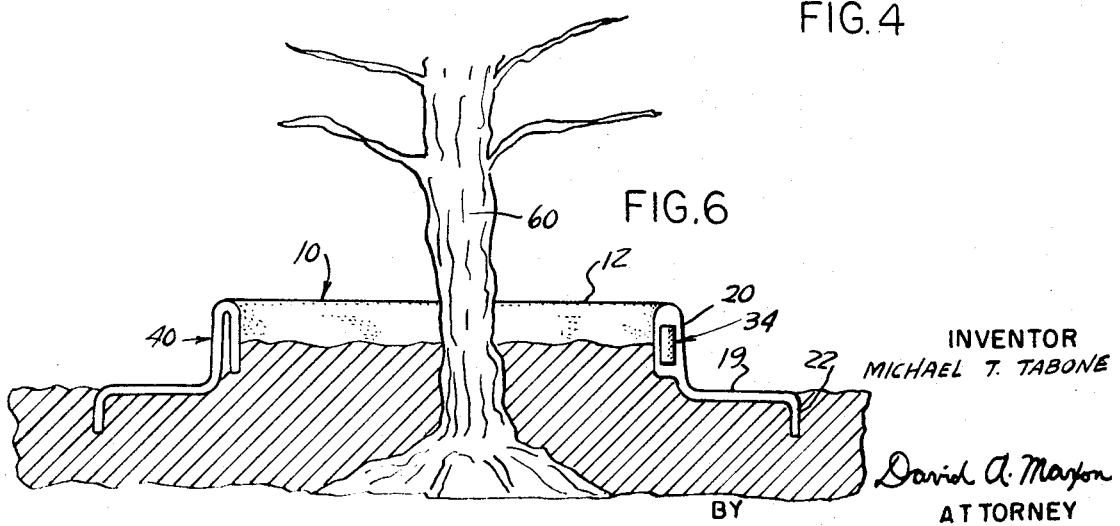
FIG. 6
INVENTOR
MICHAEL T. TABONE
BY David A. Maxton
ATTORNEY

PLANTER

This invention relates generally to planters. More specifically, this invention relates to planters having plastic toroidal members with corresponding interlocking male and female portions and portions segregating soil and plant life outward from but immediately adjacent the planter from the soil inward from the planter and immediately adjacent the plant.

In the past, efforts have been made to devise planters which inhibit weed growth from soil immediately surrounding the planter from reaching the soil immediately adjacent the plant enclosed. It has also been an objective of efforts to design planters in the past to design such planters that come in convenient sections that are interconnectable by corresponding male and female portions and that are easy to install. Past efforts also have included the objectives of a planter design that is aesthetic and decorative and hence increasing sales appeal; that are inexpensive to produce, sell and use; and are made of comparatively light-weight material.

Prior to this invention, no planter has optimally achieved these objectives. Accordingly, it is an object of this invention to provide a planter that does optimally achieve these objectives.

Other objects of this invention will be understood from the following specification and drawings relating to preferred and alternative embodiments of the invention.

These objects and objectives are achieved by a planter having toroidal members. The toroidal members are made of a plastic having a hardness corresponding to the hardness of "Herculite." These members have corresponding male and female portions for interlocking one with another. These members have a cross-section resembling a Z. These members have an inner upper vertical portion extending above the soil or grass surrounding the planter and separated at a distance therefrom. These members have an outer lower downwardly extending vertical portion contiguous with soil or plant life immediately adjacent to and surrounding the planter and segregating such soil or plant life from the soil immediately adjacent to the plant enclosed. An intermediate horizontal portion is provided in each of these toroidal members that is substantially co-level with the soil and plant life top surface adjacent to and surrounding the planter and that also simultaneously connects and separates the inner, upper vertical members with and from the outer downward vertical member.

Other objects of this invention will appear in the following description and appended claims, referring to the accompanying drawings forming a part of this specification.

On the drawings:

FIG. 1. is a three-dimensional perspective view of the preferred embodiment of this invention;

FIG. 2. is a three-dimensional view of a portion of FIG. 1 detailing in part the male-female interlocking portions thereof;

FIG. 4 is a view of another portion of an alternative embodiment of the invention, and FIG. 5 is a transverse sectional view of the apparatus shown in FIG. 2 along the line 5—5 thereof;

FIG. 6 is a cross-sectional view of the preferred embodiment of the invention.

Figure 3:
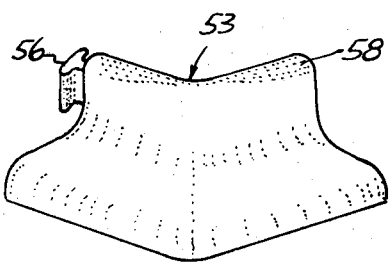
FIG. 3 is a view of the portion of an alternative embodiment of the invention.

Before explaining the present invention in detail, it is to be understood that the present invention is not limited in its application to the details of construction and arrangement of parts illustrated in the accompanying drawings since the invention is capable of other embodiments and of being practiced or carried out in various ways.

Also, it is to be understood that the phraseology and terminology employed herein is for the purpose of description and not of limitation.

As shown on the drawings:

A planter 10 is shown in FIG. 1. It comprises semi-circular members 12 and 14. These semi-circular members fit together in interlocking male-female relationship at junctions 16 and 18.

Each semi-circular member has a substantially horizontal portion 19; a radially inward substantially vertical upstanding right circular cylindrical portion 20; and a radially outwardly substantially downwardly extending vertical right circular cylindrical portion 22. The radially inward vertical portion 20 is integral with and connects with substantially horizontal portion 19 by a smooth substantially circular radial fillet portion 24. The horizontal portion 18 is integral with and connects with the downward vertical portion 22 at rounds having a substantially circular radius 26.

Referring to FIG. 2, there is illustrated the interlocking male-female relationship of two members of the planter. At the end 30 of one of the members is located structure providing a female receptacle along the edge of the inner upward vertical portion 20. This portion is illustrated in cross section at numeral 30 at FIG. 5.

Also referring to FIG. 2, at one end 32 of another member in the planter is located a portion in the inner upward vertical portion that provides a male member at the edge of that portion. This feature is illustrated in cross-section as numeral 32 in FIG. 5.

In cross-section the male member is illustrated as a substantially key-shaped member 34 having a relatively thick cross bar member 36 and relatively thin upright member 38. The cross section of the female member 40 reveals a shape corresponding to the outer periphery of the cross section of the male member 34. More particularly, the female member 40 comprises members 42 that limit the outward translation of the male member from the female member with relatively thick portion at the portals 44 of the female member. The female member 40 has an inner recess portion 46 that is adapted to receive the cross bar portion 36 of the male T-shaped member. The length of the cross bar member 36 of the male member is more fully illustrated in FIG. 2. The T-shaped male member 34 is part of an integral width of the upper inner radial portion 20 of a section member 12 and is located at the edge 32 of the upright member 20.

The female member 40 is integral with the end 30 of an upright member 20 and appears as an overlapping feature continuing the upright portion 20 in overlapping going back downward down substantially the vertical expanse of the upright portion 20.

From the foregoing description it can be appreciated that the pieces 12 can be joined together by sliding the female portion of a piece 12 over the male portion 40 to fit in to an interlocking relationship that holds the pieces together.

As indicated, FIG. 1 shows a preferred embodiment of the invention comprising semi-circular sections 12, 14 that interlock together to form a circular planter. In FIGS. 3 and 4, there is illustrated, respectively, angular sections 53 and 54 respectively. Section 53 is the mere image of section 54. Two of each of these pieces can be joined together in interlocking male-female relationship to form a rectangular or square planter. Each of the sections 53, 54 except for their right angle configuration are similar in many respects to the cirular sections 12, 14. Each of the angular sections 53, 54 have male members 56 and 57 respectively that correspond precisely to the configuration of the male members 34 of the circular section members. These male members 56, 57 have a corresponding interlocking relationship with female members 58 and 59, respectively, in a manner similar to that described with respect to the semicircular sections 12.

Other shapes of sections or members of the planter similar to those described above can be utilized in practicing the invention. For example, a straight piece can be utilized that has a male member precisely the same as male members 56, 57 and also female members that precisely correspond, 58, 59, to provide a rectangular planter entity or a planter entity having a larger area than that provided merely by four sections, two each of those sections corresponding to sections 53, 54.

In FIG. 6 there is illustrated in cross-sectional view the use of the planter with a plant. A tree 60 is shown situated in the center of a circular planter 10. The lower radially outward portion 22 of a section or member 12 is shown embedded in the ground at 62. The upward vertical member 20 of such a section 12 is shown to be above the ground level of the ground surrounding the perimeter of the planter and also enclosing the soil in which the plant 60 is planted. The intermediate portion 19 of each of the sections 12 is shown to be approximately at ground level, that is level with the ground at the outer perimeter of the planter. All of the components and portions, members and sections of the planter can be made from plastic. A preferred type of plastic is an epoxy type of material or a material of a plastic nature having a hardness similar to the hardness of Herculite.

The plastic material can be formed by extrusions or moldings.

It can be appreciated from the foregoing description that mention has been provided that can be a decorative planter that will inhibit weed growth in the soil immediately adjacent the plant within the interior of the planter, that is light weight and easy to install or remove; that is capable of inexpensive manufacture and marketing; that provides a rigid structure for enclosing other garden items in addition to plants such as stones and art objects; and that is capable of being produced in a wide variety of shapes.

I claim:

1. In a plant enclosure, the improvements comprising:

sectional members forming an interlocking male-female relationship with one another in forming an enclosure of a plant;

each of said sectional members having an outward downwardly depending vertical portion protruding substantially below ground level and separating the soil adjacent the plant enclosed from the soil outward from the outer perimeter of said plant enclosure;

each of said sectional members having an inward upwardly ascending vertical portion projecting above the ground level of the soil immediately adjacent the outer perimeter of said plant enclosure;

each of said sectional members having an intermediate portion adjacent to, connected to, rigidly attached to, and integral with the aforesaid downwardly depending and upwardly ascending portions;

said intermediate portion being substantially level with the level of soil immediately adjacent the outer perimeter of said plant enclosure;

each of said sectional members having an integrally formed male portion thereon at an end thereof;

each of said sectional members having a female portion corresponding in shape to the outer surface of said male portion and adaptable to receive said male portion in an interlocking rigid relationship;

said sectional members being joined together in the aforesaid male-female interlocking relationship so as to form a planter entirely enclosing the plant segregating said plant from soil and flora immediately adjacent to the outer perimeter of said planter;

said female portion being at one end of each of said sectional members and having an aperture opening near the bottom thereof and being closed near the top thereof whereby one of said members can be mated with another of said members by dropping vertically one of said members onto a space immediately adjacent the other of said members in forming a mating, locking connection therewith free of any horizontal translation required of the piece to form the mating, locking relationship with the other member, said male portion having a constituent limiting the horizontal translation of a sectional member joined to the sectional member having the male portion with respect to the sectional member having the male portion.

2. The article of claim 1 wherein each of said sectional members is made of a plastic material having a density no greater than twice the density of water at 1° C.

3. The article in claim 1 wherein each of said sectional members is made of a plastic material that is moldable and yet has a resultant finished hardness substantially equivalent to the hardness of acrylonitrile butadine styrene.

4. The article of claim 1 wherein each of said male member portions is T-shaped in cross section.

5. The article in claim 1 wherein said planter in its plan view has a circular shape.

6. The apparatus of claim 1 wherein said planter has a substantially rectangular shape.

7. The apparatus in claim 1 wherein each of said sectional members in plan view has an annular semicircular configuration.

8. The apparatus in claim 1 wherein each of said sectional members in plan view has a right angular configuration.

9. The apparatus in claim 1 wherein the male and female interlocking portions are integral with and at the edge of the inner upwardly ascending portion of each of said sectional members.

10. The apparatus in claim 1 wherein each of said sectional members in plan view is of right angular configuration and two of said sectional members are the mirror image of the other two of said sectional members.

11. The apparatus of claim 1, wherein said outward downwardly depending vertical portion and said inward upwardly ascending vertical portion have substantially the same thickness throughout their lengths as the intermediate portion of each of said sectional members.

12. The apparatus of claim 1, wherein said intermediate portion has an upper substantially planar surface virtually free of irregular and discontinuous surface deviations and connecting with the outer surfaces of said outward downwardly depending vertical portion and said inward upwardly ascending vertical portion with smooth arcs free of sharp or angular discontinuous surface formations.

13. The apparatus of claim 1, wherein said downwardly depending portion has a substantially identical thickness from top to bottom thereof and being free of serrations, knurls and other sharply discontinuous edge features throughout most of its length.

* * * * *